May 10, 1966 J. R. BASHOR 3,250,181
FULLY AUTOMATIC KEYWAY SHAPER
Original Filed Nov. 19, 1962 9 Sheets-Sheet 1
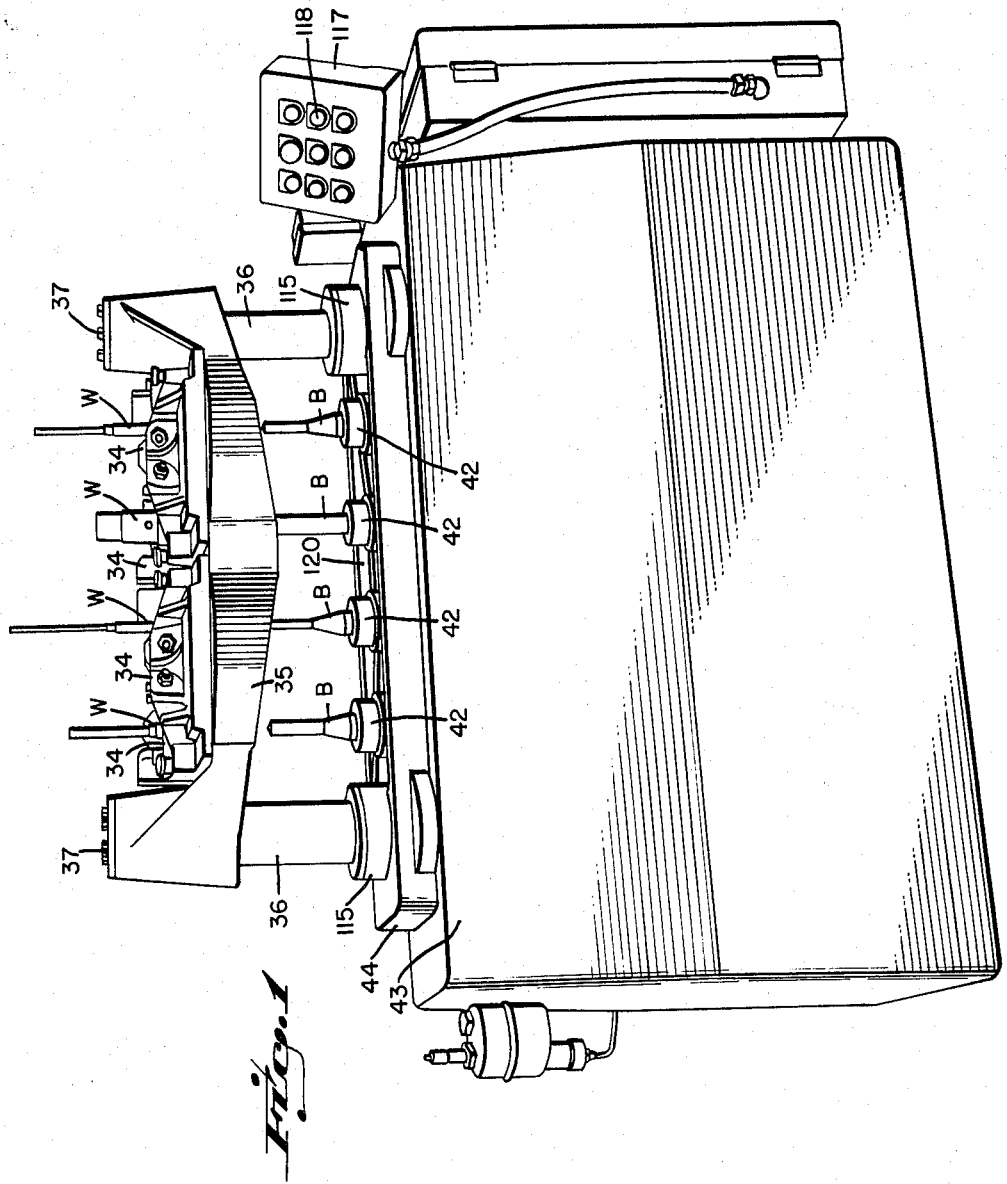
INVENTOR.
JAMES R. BASHOR
BY
ATTORNEY

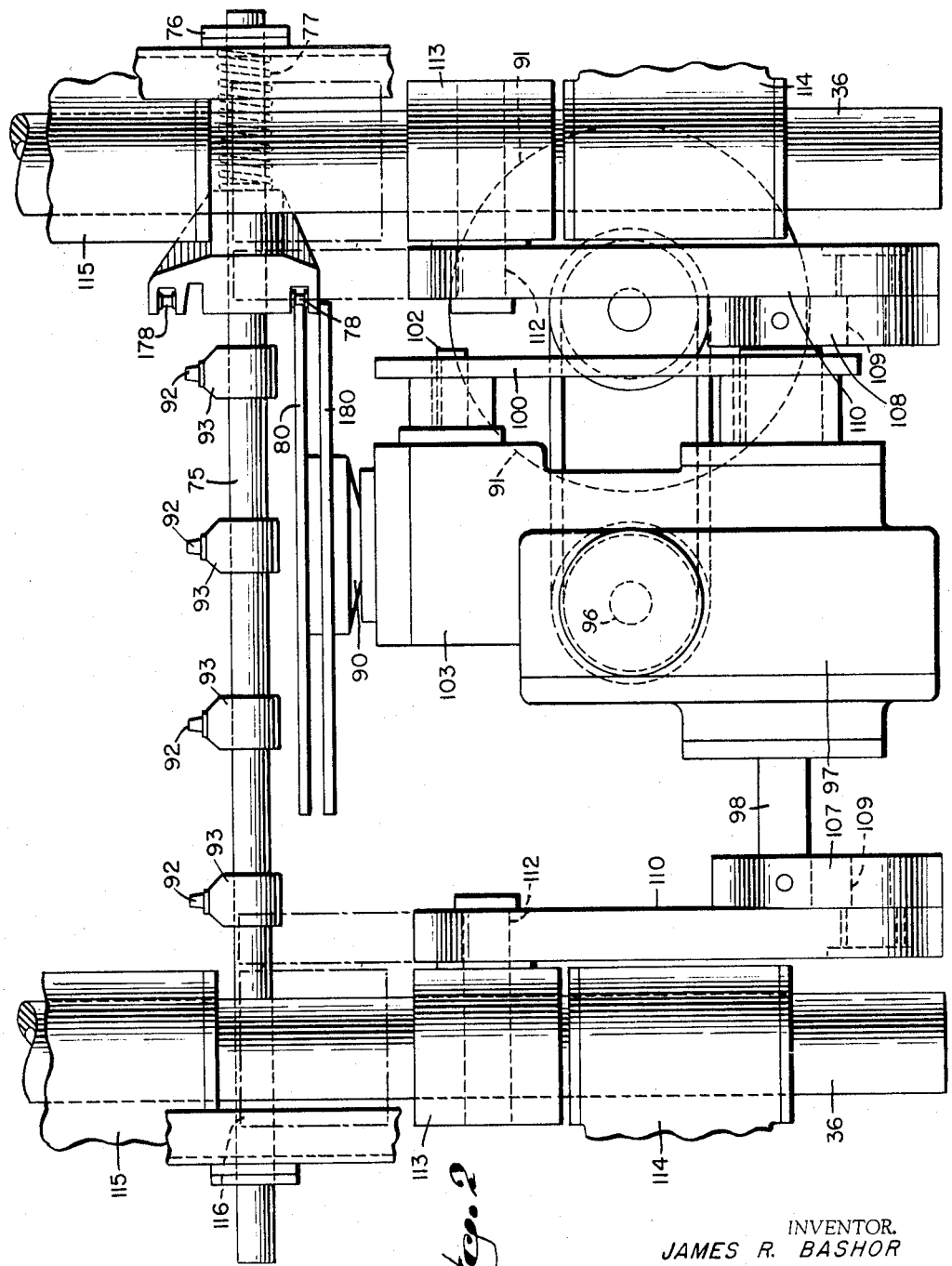

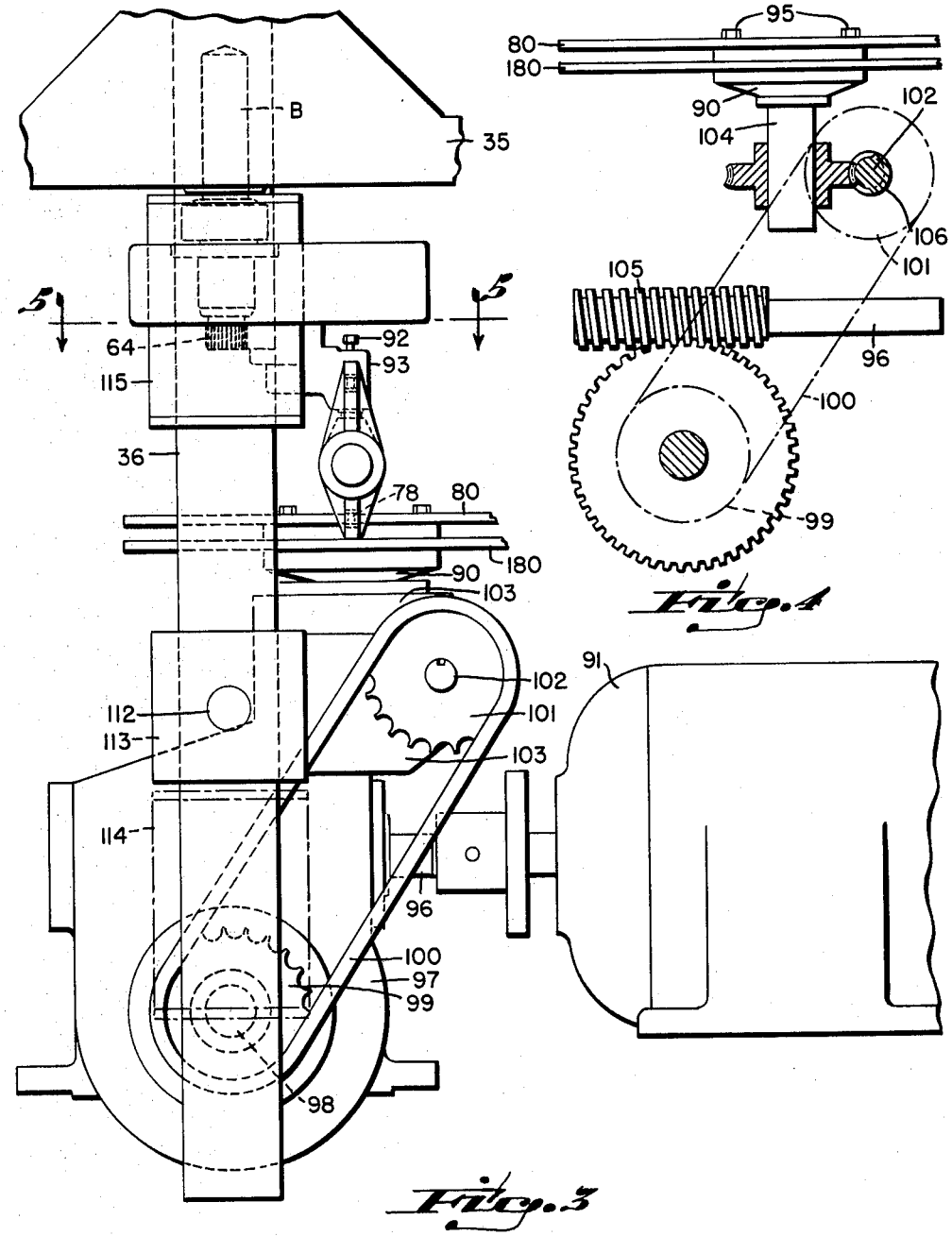

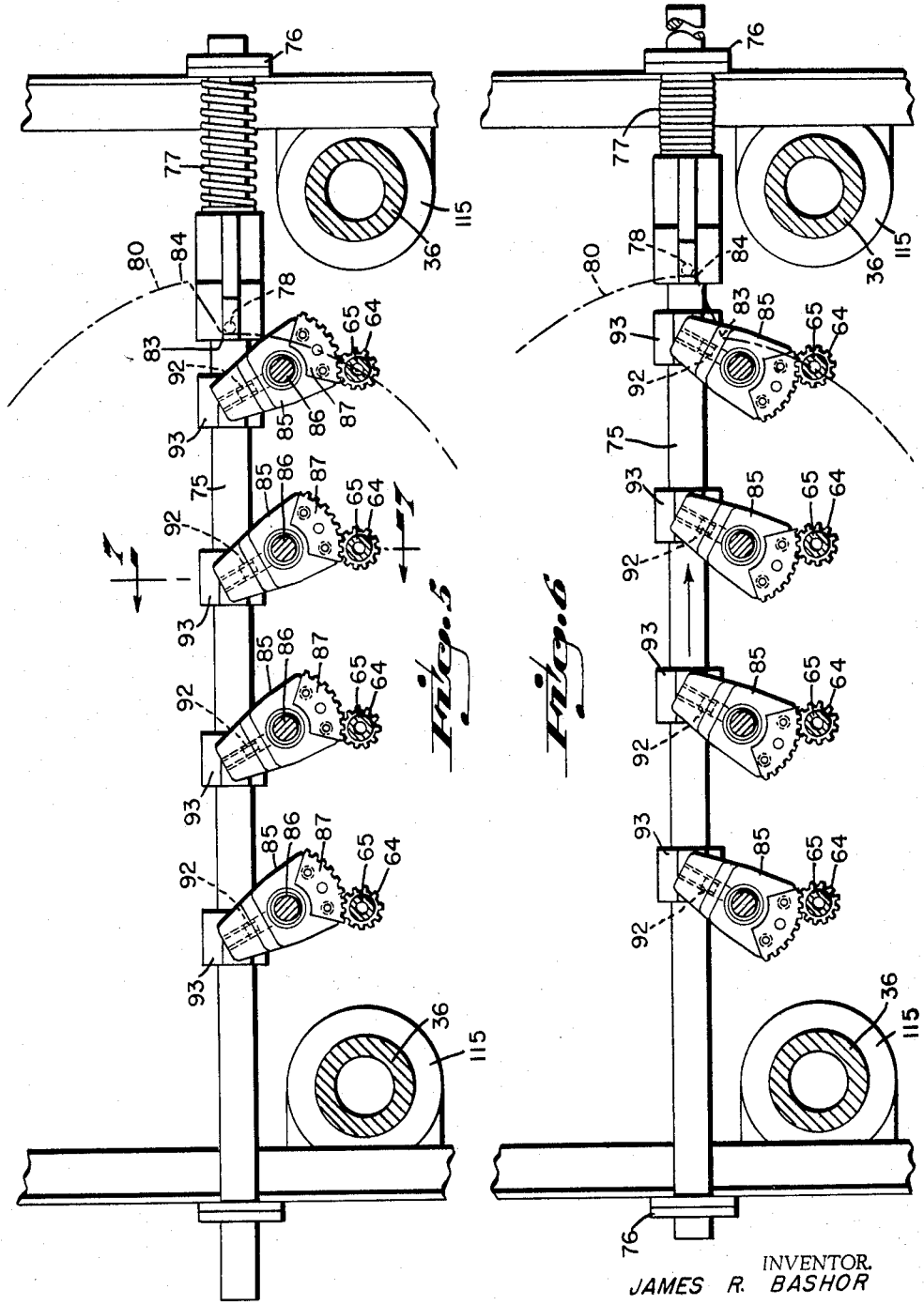

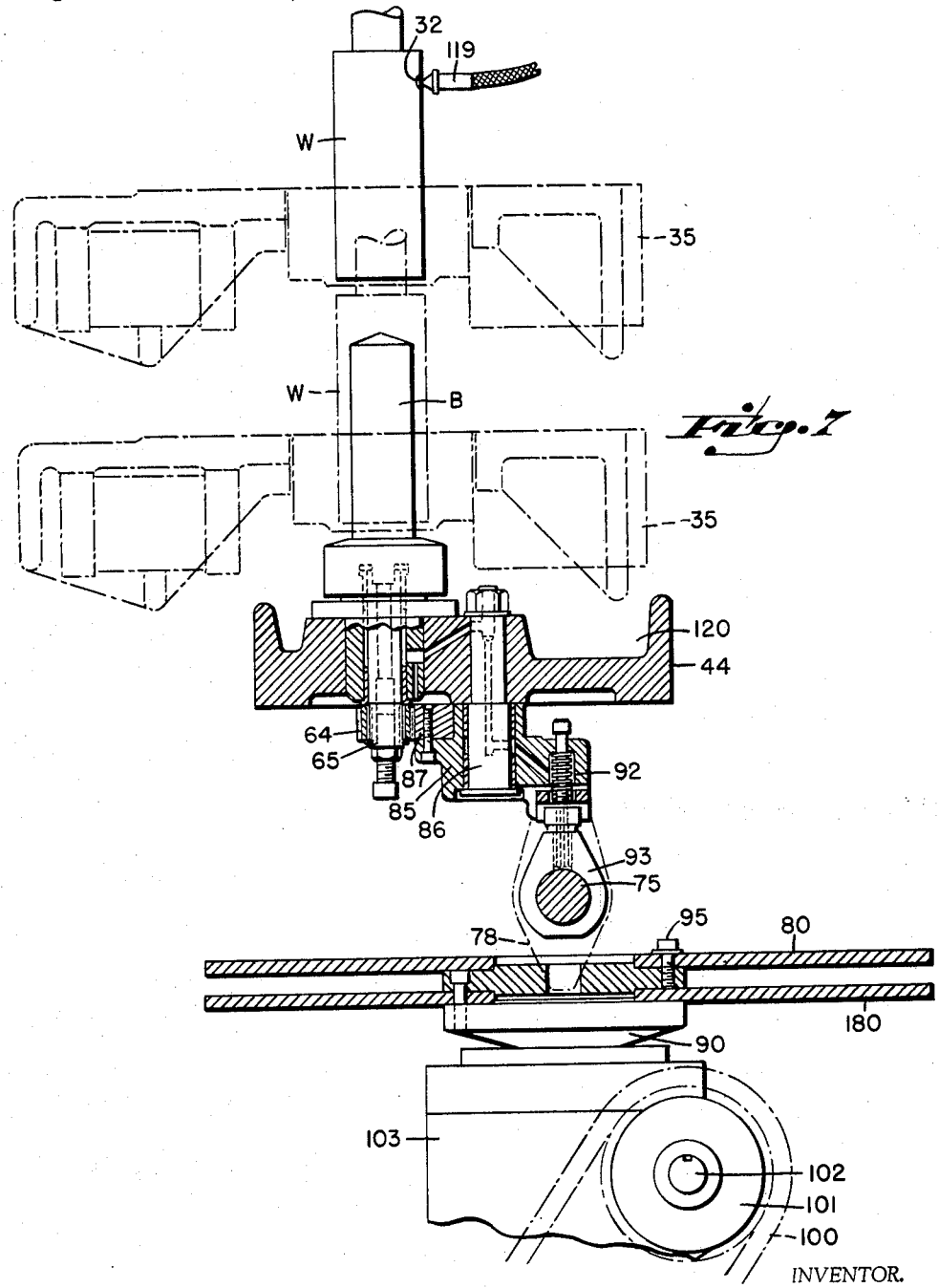

May 10, 1966  J. R. BASHOR  3,250,181
FULLY AUTOMATIC KEYWAY SHAPER
Original Filed Nov. 19, 1962  9 Sheets-Sheet 6

INVENTOR.
JAMES R. BASHOR
BY
ATTORNEY

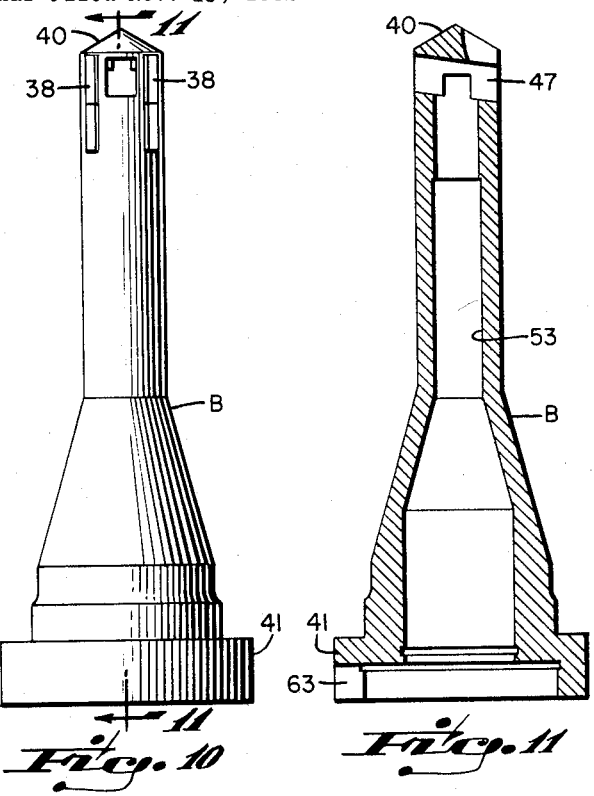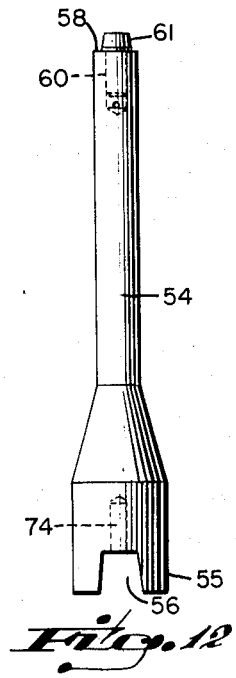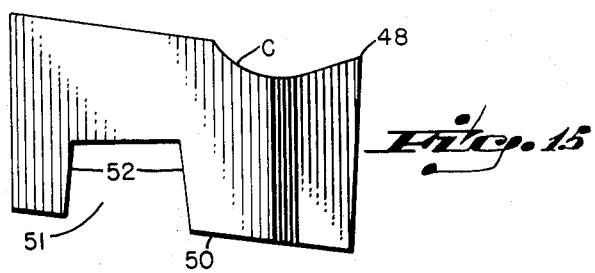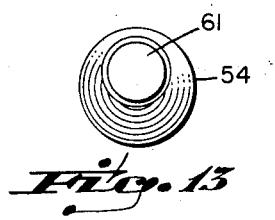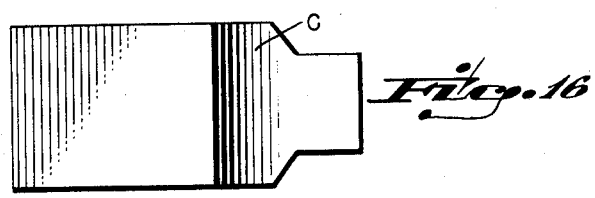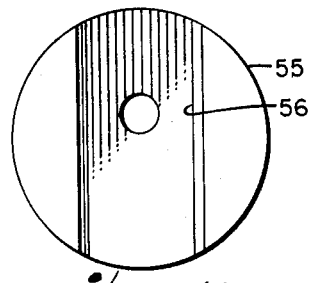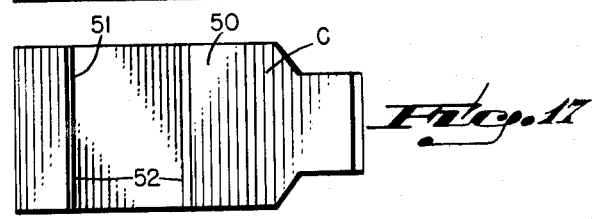

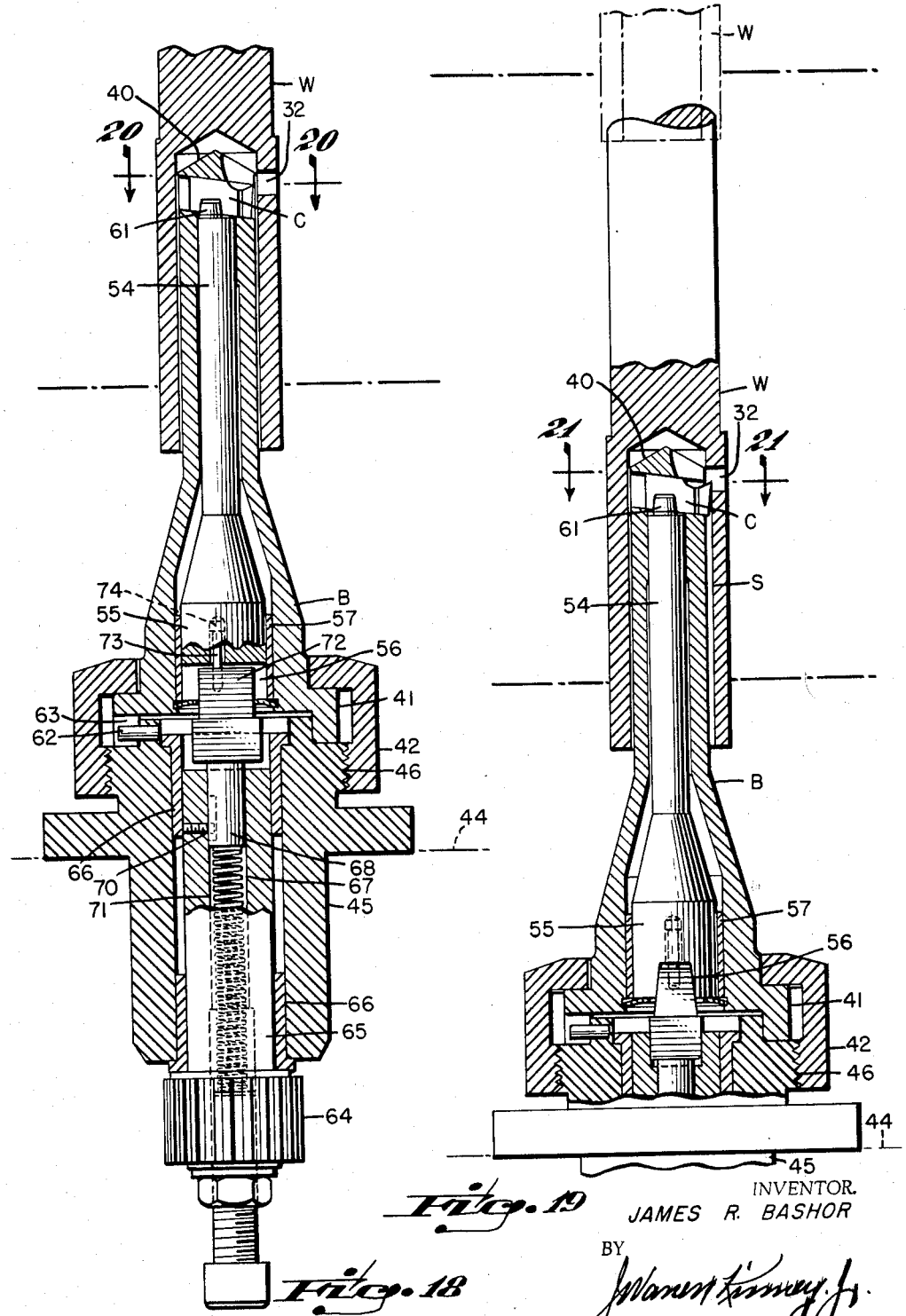

May 10, 1966　　　　J. R. BASHOR　　　　3,250,181
FULLY AUTOMATIC KEYWAY SHAPER
Original Filed Nov. 19, 1962　　　　　　　　　　9 Sheets-Sheet 9
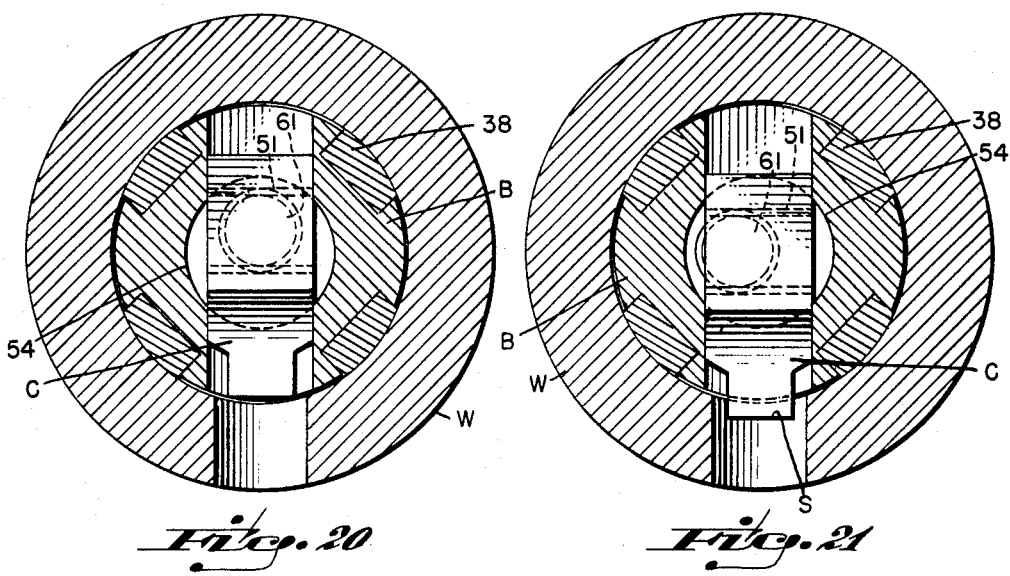
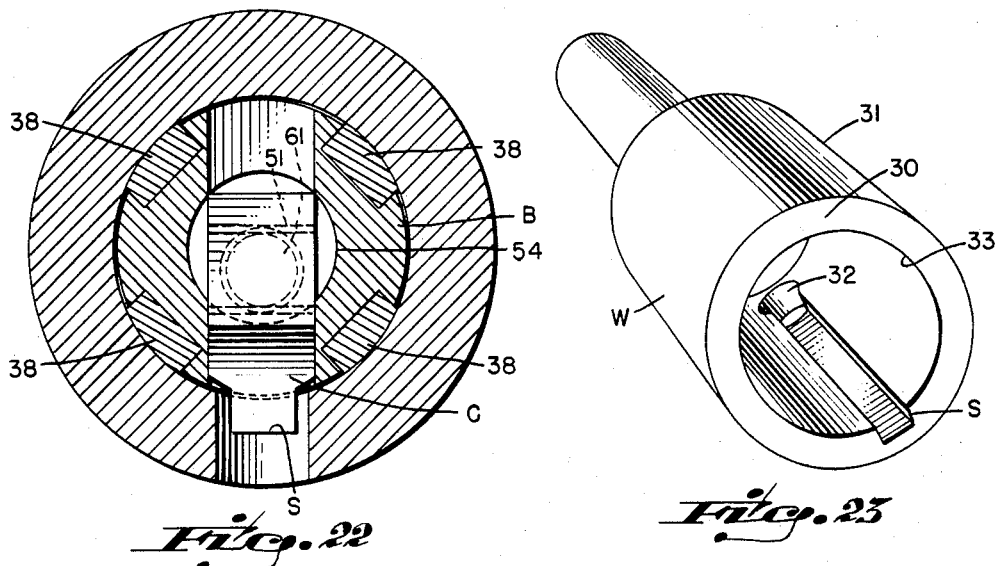
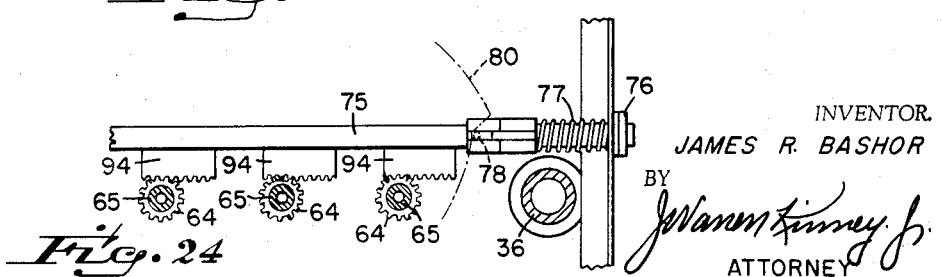
INVENTOR.
JAMES R. BASHOR
BY
ATTORNEY United States Patent Office 3,250,181
Patented May 10, 1966

3,250,181
FULLY AUTOMATIC KEYWAY SHAPER
James R. Bashor, Cincinnati, Ohio, assignor to United States Drill Head Company, Cincinnati, Ohio, a corporation of Ohio
Original application Nov. 19, 1962, Ser. No. 238,472, now Patent No. 3,195,414, dated July 20, 1965. Divided and this application Feb. 25, 1965, Ser. No. 457,885
10 Claims. (Cl. 90—24)

This is a division of application Serial No. 238,472, filed Nov. 19, 1962, now Patent No. 3,195,414, issued July 20, 1965.

This invention relates to an internal keyway or slot cutter, such as may be employed in cutting keyways or slots in blind or through holes of a workpiece.

An object of the invention is to greatly facilitate and expedite the cutting of a slot or keyway within a bore of a workpiece.

Another object is to achieve unusual accuracy in slotting a wall of a bore parallel to the bore axis.

Another object of the invention is to prolong the useful life of the tool employed in cutting internal keyways or slots.

A further object is to provide a machine operative automatically to start and complete a keyway cutting operation without the intervention of an attendant, once the workpiece has been set up for machinery.

Another object is to provide a novel form of tool bar for internal keyway cutting purposes.

Another object of the invention is to enhance the keyway cutting operation and the quality of the work performed, by automatically dislodging chips from the bore concurrently with each withdrawal of the tool bar, this resulting also in prolonging the life of the cutting tool.

A further object is to provide high production apparatus for precision cutting of keyways or slots in a workpiece bore.

The foregoing and other objects are attained by the means described herein and illustrated upon the accompanying drawings, in which:

FIG. 1 is a perspective view of the front of the machine embodying the present invention.

FIG. 2 is a fragmentary front elevation of a cam drive means and head actuating mechanism.

FIG. 3 is a side elevation of the structure illustrated by FIG. 2.

FIG. 4 is a fragmental detail view of the cam and head actuating means.

FIG. 5 is a cross-sectional view taken on line 5—5 of FIG. 3, showing part of a cutter feed mechanism in initial starting position.

FIG. 6 is a view similar to FIG. 5, showing the cutter feed mechanism advanced to a position of maximum cutter feed.

FIG. 7 is an enlarged cross-section taken on 7—7 of FIG. 5, and indicating by means of broken lines an elevated and a lowered position of a head which carries the workpiece to be slotted.

FIG. 10 is a side elevation of a cutter support bar embodying the invention.

FIG. 11 is a cross-section taken on line 11—11 of FIG. 10.

FIG. 12 is a side elevation of cutter bar insert, which is adapted to rock axially within the cutter bar of FIG. 11.

FIG. 13 is a top plan view of the insert, on an enlarged scale.

FIG. 14 is a bottom plan view of the same, likewise enlarged.

FIGS. 15, 16 and 17, are respectively, side, top, and bottom views of a cutter, on a greatly enlarged scale, adapted to be supported by the cutter bar shown in FIGS. 10 and 11.

FIG. 18 is a vertical cross-section of the cutter support bar with a cutter and an insert assembled therein, together with means for rotationally rocking the insert and feeding the cutter, and showing a workpiece superposed thereon in readiness for internal slotting.

FIG. 19 is a view similar to FIG. 18, part being broken away, and showing the workpiece at an intermediate stage of internal slotting.

FIG. 20 is an enlarged cross-section taken on line 20—20 of FIG. 18.

FIG. 21 is an enlarged cross-section taken on line 21—21 of FIG. 20, and showing the workpiece slotted to an intermediate depth by the cutter.

FIG. 22 is a view similar to FIG. 21, but showing the cutter advanced to maximum slot depth.

FIG. 23 is a perspective view of a typical and exemplary workpiece finished by internal slotting in accordance with the present invention.

FIG. 24 is a view similar to FIG. 5, on smaller scale and part broken away, showing a modification by means for control of the cutter feed.

Figure 8:
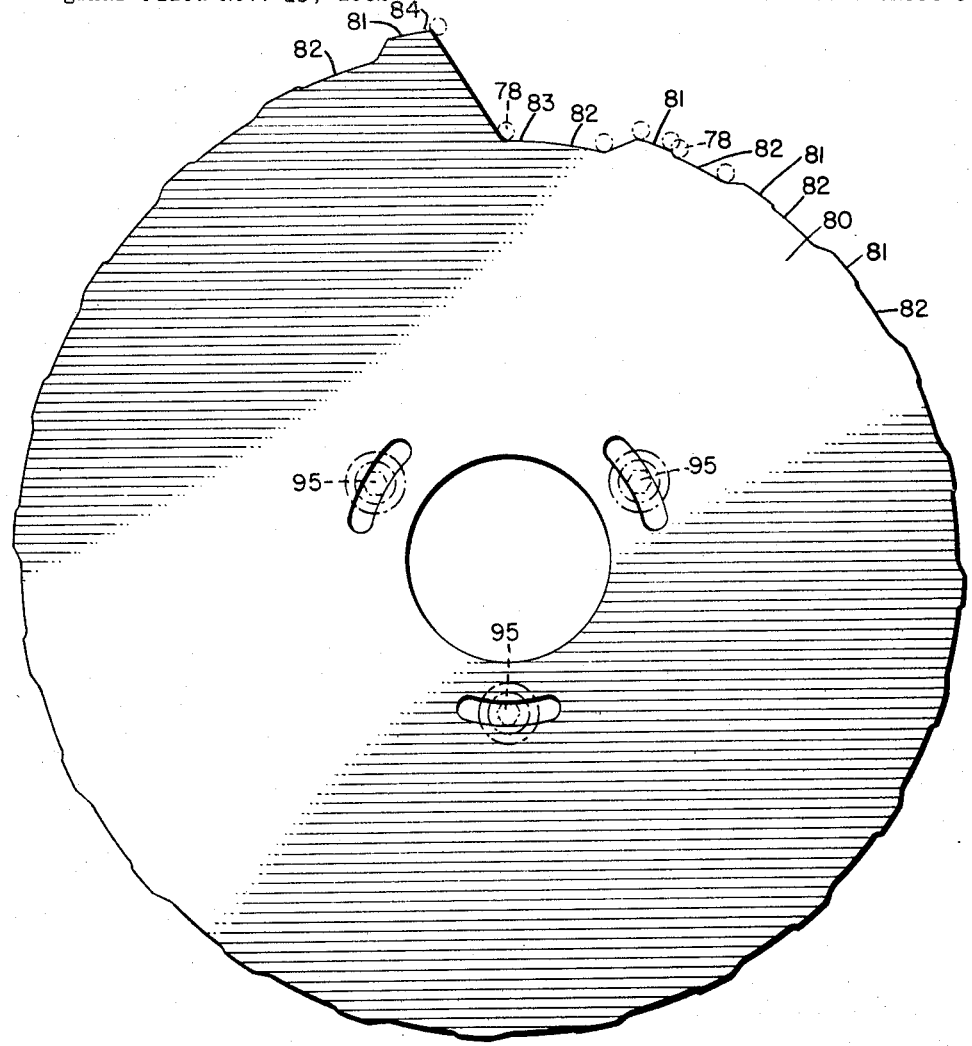
FIG. 8 is a plan view of a cutter feed control cam, constituting a detail of the invention.

Common practice in the cutting of internal keyways longitudinally of a workpiece bore, has been to rigidly clamp the workpiece upon a stationary support, and reciprocate within the bore a cutter fixedly mounted upon a cutter bar fed, both longitudinally and laterally within the bore for removal of metal at the keyway location. The bar carrying the cutter was necessarily much smaller in diameter than the workpiece bore, and the end thereof opposite the cutter end was invariably mounted upon a feed carriage at a location outside the entrance end of the workpiece bore.

By reason of the remoteness of the bar mount from the area of cut within the bore, the bar was subject to slight bending which caused chatter as the cutter performed to remove metal at the keyway, this resulting in rough machining and inaccurate keyway depth dimensions, aggravated in many instances by a tendency of the cutter to wander sidewise of the line of cutting due to twist or lateral bending of the cutter bar, or to play resulting from wear in the bar feed mechanism. Thus, it was not uncommon for a completed keyway to be defective as to depth, finish, uniformity of width, or crookedness. Such defects were often found to interfere with the rapid and accurate assembly of machined parts or components.

Deficiencies such as those above mentioned, accounted for undue cutter wear and breakage, which interfered with rapid production schedules and cost estimates. Such considerations have been largely minimized by means of the present invention.

With reference to the drawings, FIG. 23 illustrates a typical workpiece in the form of a high alloy steel spindle, whose internal keyway has been cut accurately and smoothly using the means of the present invention. Under actual production conditions, the keyway was cut in thirty-five seconds, whereas by conventional method the production time required 8 to 10 minutes of machining.

It is to be understood that the workpiece may differ considerably from the disclosure of FIG. 23, which is merely exemplary. The workpiece may as well be a gear, a pulley, or a metallic mass of any shape, having either a blind bore or a through bore to be slotted internally.

When the bore to be slotted is a blind bore, as FIG. 23 indicates, the wall 30 of workpiece 31 is preferably drilled transversely to provide a relief hole 32 at which the cutter ends its cutting stroke, so as to avoid its striking the bottom of bore 33. The machined keyway or slot is throughout the drawings indicated by the character S, and the tool which cuts the keyway or slot is designated the cutter C. The workpiece is designated W.

With reference to FIG. 1, it may be noted that the drawing depicts four different workpieces W, varying as to size or shape, and each being held by clamps or chucks 34 carried by the movable head 35 of the machine. Head 35 is adapted for vertical reciprocation by means of plungers 36 to which the head is fixed at 37, the plungers being operative in unison.

At B are indicated cutter bars, held stationary in the course of a slot-cutting operation, and each carrying a cutter C. In operation, the workpieces fixed to the head descend repeatedly about the cutter bars, the latter entering the bores of the workpieces with very close tolerance so as to have bearing support all around the wall of the bore. Thus, during every pass of the cutter, the bar carrying the cutter is backed up by the wall of the bore to eliminate any tendency of the cutter bar to bend or twist while the cutter is removing metal from the workpiece wall.

In the course of the slotting procedure, the sharpened tip of the cutter is progressively advanced laterally of the bar axis, for deepening the slot in stages until the desired depth is achieved. At the beginning of the slotting procedure, of course, the tip of the cutter is enshrouded within the limits of the bar, see FIG. 18. In FIG. 19, cutter C is shown advanced laterally to about half of its advancement limit, wherefore it has performed to cut about half of the required depth of the slot or keyway S.

The stages of cut just mentioned, are indicated likewise upon FIGS. 20 and 21. The cutter limit of advancement is depicted in FIG. 22, wherein the keyway or slot S is at maximum depth and is completed. The characters 38 indicate replaceable wear strips carried by the cutter bar in the region of the cutter, for maintaining a close sliding fit of the cutter bar within the smooth bore of the workpiece while the cutter is removing metal.

It may here be pointed out that the workpieces W shown in FIG. 1 may be identical to one another if desired, and in that event the several cutter bars operative thereon will also be identical to one another. Thus, a plurality of identical workpieces may be machined at one time for increasing output. The number of workpiece stations may of course be increased or decreased in number, to achieve a desired output rate.

The cutter bar B, FIGS. 10 to 22, may comprise a turned hollow body having a conical upper end 40, and an enlarged lower end carrying an annular flange or base 41 whereby the bar may be detachably secured, as by means of an encircling nut 42, in fixed relation to the machine housing 43. The housing may include a reinforced upper bonnet or stationary support 44, carrying a series of mounting elements in the form of bored cylindrical sleeves 45 (FIG. 18), one for each cutter bar, and fixedly mounted in any suitable manner upon the bonnet. Each sleeve may have an externally threaded upper end 46 to accommodate the threads of a nut 42, whereby bar B may be detached, and replaced by another whenever necessary.

At its upper end 40 (FIG. 11), the cutter bar is provided with a transverse through-passageway or socket 47, preferably rectangular in cross-section, to receive a bar of tool by FIGS. 15, 16, 17. The length of the cutter must not exceed the diameter of bar B at socket 47. This assures initial entry of the cutter into the workpieces bore without interference by the cutter, in setting up the workpiece for clamping upon head 35. With the workpiece initially fitted over the cutter bar B, as in FIG. 18, the workpiece is ready for clamping to the head, and this is accomplished preferably by means of pneumatic or hydraulic clamps, the jaws of which adjust to the position of the workpiece and hold it firmly without shifting the workpiece. Such self-adjusting clamping devices or chucks are readily available in the market.

As FIG. 11 shows, cutter socket 47 preferably is inclined slightly to neutralize any tendency of the cutter to gouge in view of the upturn of cutter tip 48, FIG. 15.

It may here be noted that the bottom face 50 of the cutter C is transversely channeled or recessed at 51, with the sides 52 of the channel slightly flared downwardly and outwardly, for a purpose to be explained.

For feeding and withdrawing the cutter through socket 47, there is provided the cutter bar insert of FIG. 12, which is insertable in the bore 53 of the cutter bar. The insert 54 is in effect a turned shaft having a lower end 55 enlarged in diameter and provided with a tapered cross-slot 56 adapted to receive a key or tongue for rockingly rotating the insert within the bore of bar B. The insert is to have a nice fit within the bar bore, and may be bushed as indicated at 57 of FIG. 18.

At its upper flat end 58 the insert is drilled longitudinally, and off center, to receive a pin 60 provided with a tapered head 61 that extends beyond the end 58 of the insert. The pin head 61 is eccentric to the axis of the insert 54 (FIG. 13). The taper of the eccentric head 61 is complementary to the taper of cutter channel 51, so that when a cutter is placed in socket 47 of cutter bar B, and insert 54 is projected upwardly into the bore of said bar, the eccentric head 61 will nicely and without clearance repose within the cutter channel 51.

It will be evident from the foregoing explanation, that step rotation of insert 54 will cause the eccentric head 61 to advance cutter C stepwise along the length of socket 47. One-half rotation of insert 54 will shift the cutter from the fully retracted or home position of FIG. 20, to the fully advanced position of FIG. 22. The travel of cutter C is to correspond with the depth of the keyway desired, and is dependent upon the eccentricity provided for head 61.

Accordingly, if the workpiece is bodily reciprocated relative to the cutter bar, and if insert 54 is slightly rotated each time the workpiece is lifted off the cutter bar, then with each advancement of the workpiece onto the cutter bar a deeper cut will be performed by cutter C. Upon execution of a predetermined number of workpiece reciprocations, the cutter will have finally assumed a position of full advancement (FIG. 22), at which time the keyway will have been completed and the workpiece will then be unclamped and removed from the machine.

The character 62 (FIG. 18) indicates a locating pin anchored in fixed sleeve 45 and adapted to register with a slot 63 in the base of cutter bar B, to assure a definite disposition of cutter C with respect to the workpiece, so that all workpieces will be key-slotted at the same location within the workpiece bore.

Step rotation of insert 54 and its eccentric 61, is effected through a pinion 64 which is fixed upon the lower end of a hollow rock shaft 65 journaled in bearings 66 of sleeve 45. The bore 67 of the rock shaft carries a stud 68 which, by means of a pin and slot connection 20, is permitted limited longitudinal shifting movement within the bore, but is held against rotation therein. Stud 68 is constantly urged upwardly by a spring 71.

Formed integrally with stud 68 is an upstanding key 72 tapered complementarily to cross-slot 56 of the insert 54, so that key 72 may drive the insert without play or backlash occurring. The top of key 72 may carry an upstanding locating pin 73 adapted to enter an offset hole 74 in the base of insert 54, so that the key will properly register with cross-slot 56 whenever cutter bars are replaced or substituted. Pinion 64 is adapted for step rotation in the course of the slotting operation, as will be explained.

Figure 9:
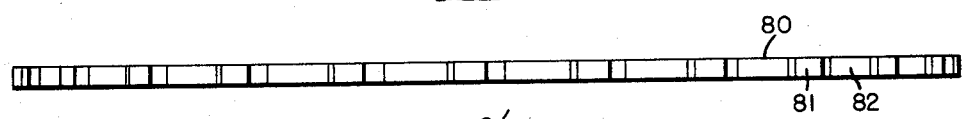
FIG. 9 is a side elevation of the same.

Referring to FIG. 5, the character 75 indicates a longitudinally shiftable cutter feed bar which is slidably supported in bearings 76 carried by the machine housing. Bar 75 is constantly biased toward the left by a suitable spring 77. The bar carries a cam follower 78, which by the force of spring 77, is yieldingly held in contact with a cutter feed cam 80. Feed cam 80 is detailed in FIGS. 7, 8 and 9, and is seen to comprise a flat disc having its perimeter provided with alternate humps 81 and depressions 82, over which travels the cam follower 78 as the cam is slowly rotated.

The perimeter of cam 80 is in general a volute, and has therefore a high point 84 and a low point 83. Thus, with reference to FIG. 5, if cam 80 is slowly rotated in counter-clockwise direction, the follower on bar 75 will be progressively shifted to the right, carrying with it the feed bar 75 until finally the bar reaches the position of maximum shift, as illustrated by FIG. 6.

Such shifting of feed bar 75 acts to rotate the rockers 85 about their stationary pivots 86, from the FIG. 5 position to the FIG. 6 position, thereby causing the gear segments 87 of the rockers to rotate each pinion 64 through 180 degrees. As was previously explained, this amount of pinion movement results in advance of cutter C from the fully retracted position of FIG. 20 to the fully extended position of FIG. 22. As cam 80 continues to rotate (FIG. 6), the high point 84 of the cam will move past the follower 78, whereupon the latter will descend to the low point 83 of the cam (see FIG. 5), for returning the rockers and pinions 64 to the initial or home position of FIG. 5. At the home position, cutters C will be fully retracted, as previously explained.

In connection with the foregoing explanation, it must be appreciated that the feed of a cutter C is advanced slightly each time that the workpiece is withdrawn fully from the cutter bar, so that a deeper cut is performed with every pass of the workpiece over the cutter. Also, whenever the cutter completes a pass within the workpiece bore, the cutter is relieved by slightly reversing its feed at approximately the same time that the workpiece starts to withdraw from the cutter bar.

The actions referred to above are initiated by the humps and depressions 81, 82 of feed cam 80. Beginning at the low point 83 of the cam, successive depressions 82 are located at progressively greater distances from the cam center, all the way around to the hump 81 at the high point 84 of the cam. Likewise, the humps 81 from the low point to the high point of the cam, are disposed at progressively greater distances from the cam center.

In consequence, the follower 78 beginning at the low point of the cam, travels onto the first hump 81, whereupon the follower and bar 75 are shifted longitudinally to slightly actuate a rocker 85 which in turn slightly rotates a pinion 64, thereby to extend the cutter in readiness for a first keyway cut. By the time the first cut is completed, the cam has moved to bring the follower to the depression 82 following the first hump, which results in a rocker movement that reverses the rotation of pinion 64 and thereby effects a slight retraction of cutter C for relieving the latter as the workpiece begins to recede off the cutter bar. Thus, the cutter is prevented from scraping the metal during the receding stroke of the workpiece.

The next cut is set up by the follower mounting the second hump 81 of the rotating cam. The second hump, being slightly farther from the cam center than is the first hump, feeds the cutter C a greater distance in readiness for the second keyway cut, and this occurs while the workpiece W is withdrawn, as shown in full lines at the top of FIG. 7. Thus, as cam 80 continuously rotates with its driven palette 90, the cutter C (one or more) is alternately fed and relieved to progressively form the keyway, until finally, upon completion of a full rotation of cam 80, the follower 78 drops off the high point of the cam and returns to starting position at the low point 83. At the same time, the machine is stopped to permit removal of the finished workpiece, or workpieces, preferably by de-energizing the driving motor 91, declutching it.

Referring back to FIGS. 2 to 7, the characters 92 indicate suitable pivots between one end of each rocker 85 and a cooperative pivot block 93 fixed upon the feed bar 75. The details of this pivot connection are unimportant to the present invention.

The modification of FIG. 24 illustrates a simplified form of means for translating reciprocatory movements of feed bar 75 to the several cutter feed pinions 64. Here the rockers 85, their pivotal mountings, and the blocks 93 are eliminated, and in place thereof are installed simple toothed racks 94 fixed upon the feed bar 75 with their teeth meshing with the pinion teeth. In this construction, feed bar 75 may be square in cross-section where the racks are applied, and may in fact be square throughout its length so as to slide in square journals at 76 to assure non-rotation of the bar while permitting longitudinal shifting under the influence of follower 78 and spring 77 or its equivalent.

It may be noted from several of the drawing views that cutter feed cam 80 overlies a second cutter feed cam, identified as 180, which latter is simply an alternative whose peripheral contour may incorporate certain slight modifications to vary the characteristics of the cutter feed, when desired. Cam 180 may be rendered operative by simply rotating the cam follower element (FIG. 2) a half turn upon bar 75, to place the secondary follower 178 in register with the periphery of cam 180. Cams 80 and 180 are both normally fixed upon the rotary palette 90, but may be removed, replaced, or adjusted rotationally relative to the palette, at screws 95, FIG. 8.

The main drive for the apparatus is best illustrated by FIGS. 2, 3 and 4, and includes the electric motor 91 whose shaft drives the input shaft 96 of a reduction gear box 97. The output shaft 98 of the gear box may carry a sprocket 99 driving a chain 100, which in turn drives the sprocket 101 and shaft 102 of a second gear box 103 that supports the rotational stud 104 of palette 90. The speed reduction desired may be obtained with the use of suitable worms 105, 106, and cooperative wheels as shown in FIG. 4. This may constitute the drive for the cutter feed cam 80, or 180.

Fixed to the output shaft 98 of gear box 97, are two cranks 107 and 108 (FIG. 2), which rotate with said shaft. The outer or swinging ends of the cranks have pivotal connection at 109 with the lower ends of links 110. The upper ends of the links at 112 have pivotal connections with collars 113, which collars are fixed to the vertically reciprocable plungers 36 that carry the work head 35 at their upper ends, FIG. 1. The plungers slide in suitable fixed journals 114 and 115 carried by the machine housing.

From the foregoing, it will be apparent that rotation of the motor and shaft 98 will reciprocate the plungers 36 and the work head attached thereto, between limits indicated upon FIG. 2 by full lines 113 and broken lines 116, which corresponds to the throw of cranks 107 and 108. The crank throw is to exceed, at least slightly, the length of a keyway to be formed in a workpiece attached to head 35.

The gearing above described shall be such as to feed the cutter C in increments as determined by the humps 81 of feed cam 80, and the number of head reciprocations being equal to the number of humps traversed by follower 78 as the cam rotates a full turn. By the time the cam moves a full turn, the cutter will have executed its final pass to complete the keyway, and will be restored to starting position for a subsequent cycle of operation. By means of a simple electric switch arrangement, not shown, the circuit of motor 91 may be opened after the final cut of the tool, or upon a complete rotation of cam 80, to permit removal of the finished workpiece and application of another to be machined.

In FIG. 1, 117 indicates an electric control panel including a group of switch buttons 118 and other devices providing for starting, jogging, emergency stopping, and other controls which may be considered desirable. Such other controls may include means to initiate power clamping and release of the workpieces, which are not necessarily detailed in the present disclosure. The machine may include also automatic means for lubrication of parts, and for supplying coolant to the cutters and workpiece bores. In this connection, it is pointed out that suitable quickly-detachable coolant supply nozzles 119, FIG. 7, may be arranged to inject coolant fluid constantly into the relief holes 32 of the workpiece bores, to flush chips from the bores as the workpieces withdraw repeatedly from the cutter bars in the course of machining.

It is noteworthy that during the entire keyway cutting operation, the bore of the workpiece is vertical and open downwardly, so that chips from the cutting operation drop by gravity and/or flushing between successive cuts made by the tool or cutter. It is therefore impossible for chips to accumulate at the blind end of the bore, and thereby cause cutter damage or breakage as the cutter approaches the end of its inward travel limit. This is an important feature of the structure.

The bonnet 44 of the machine housing by preference is dished to provide a cavity 120, to catch coolant fluid and return it to a sump within the housing, whence it is recirculated by pump action to the cutting area. Also, in a modification of head 35, the top surface thereof may be planed flat and slotted in much the same manner as a shaper table, for affixation of workpieces by means of conventional clamps and bolts.

It is to be understood that various other modifications and changes may be made in the structural details of the apparatus, within the scope of the appended claims, without departing from the spirit of the invention.

What is claimed is:

1. An internal keyway or slot cutting machine, comprising in combination, a stationary support, and a head reciprocable toward and from the support, means on the head for securing a bored workpiece, with the bore open toward the support, a cutter bar fixed in upstanding position upon the stationary support, and including a cutter feedable laterally of said bar from a retracted position within the confines of the bar, to a position of extension beyond the bar limits, said cutter bar with the cutter retracted being dimensioned to have a bearing fit within the workpiece bore, for backing up the cutter when extended to cutting position, means operative to intermittently extend the cutter for progressive removal of metal from the workpiece bore, and means for reciprocating the head to repeatedly drive the workpiece toward the cutter bar, with the bar centered in the bore.

2. The apparatus as set forth in claim 1, wherein the combination includes means for terminating reciprocatory movements of the head, substantially concurrently with disposition of the cutter to fully extended position.

3. An internal keyway or slot cutting machine, comprising in combination, a stationary support, and a head reciprocable toward and from the support in a substantially vertical plane, means on the head for securing a bored workpiece, with the bore upstanding and open in the direction of the support, a cutter bar upstanding upon the stationary support, and including a cutter feedable laterally of said bar from a retracted position within the confines of the bar, to a position of extension beyond the bar limits, said cutter bar with the cutter retracted being dimensioned to have a bearing fit within the bore, for backing up the cutter when extended to cutting position, means for reciprocating the head to lower the workpiece bore about the cutter bar and to raise it therefrom repeatedly, and means operative in advance of each head lowering movement, for laterally extending the cutter to remove metal from the wall of the bore, the head in raising serving to clear the cutter bar for gravitation of chips from the bore after each cut.

4. The apparatus as set forth in claim 3, wherein the combination includes means for injecting fluid under pressure into the bore, to assist gravitational flow of chips from the lower open end of the workpiece bore.

5. An internal keyway or slot cutting machine, comprising in combination, a stationary support, and a head reciprocable toward and from the support in a substantially vertical plane, a cutter bar upstanding upon the stationary support and including a laterally feedable cutter, means on the reciprocable head for securing a bored workpiece, with the axis of the bore upstanding in alignment with the stationary cutter bar, means for reciprocating the head to lower the workpiece bore about the cutter bar and to raise it therefrom repeatedly, and means operative in advance of each lowering movement of the head, for laterally extending the cutter to remove metal from the wall of the workpiece bore, the head in raising serving to clear the cutter bar for gravitation of chips from the bore after each cut.

6. The apparatus as set forth in claim 5, wherein the combination includes means for injecting fluid under pressure into the bore, to assist gravitational flow of chips from the lower open end of the workpiece bore.

7. An internal keyway or slot cutting machine, comprising in combination, a stationary support, and a head reciprocable bodily toward and from the support, means on the head for securing a bored workpiece, with the bore open toward the support, a longitudinally bored cutter bar having a base, and means fixing said base upon the stationary support with the cutter bar aligned axially with the bore of the workpiece, said cutter bar having an upper end transversely channeled, and dimensioned to have a bearing fit within the workpiece bore whereby the workpiece is snugly slidable over the cutter bar as the head aforesaid is reciprocated, a cutter of lesser length than the diameter of the upper end of the cutter bar, said cutter having a sharpened tip normally housed within the transverse channel, and a body portion having a recess therein, the body portion of the cutter being longitudinally slidable in the cutter bar channel for selective projection of the tip from a fully retracted position within the confines of the channel, to an extended position laterally outside the channel, a rock shaft rotationally supported within the longitudinal bore of the cutter bar, said shaft having an eccentric end fitted to the recess of the cutter, for translating axial rocking movements of the shaft to longitudinal movements of the cutter within the cutter bar channel, means for bodily reciprocating the head carrying the workpiece, and rotary cam means for step-rotating the rock shaft to partially extend the cutter by action of the eccentric upon each disposition of the head to one of its limits of travel, and to reversely rotate the rock shaft between successive cutter-extending step-rotations, upon disposition of the head to its opposite limit of travel, the reverse rotations of the rock shaft being of lesser extent than the preceding cutter-extending step-rotation.

8. The apparatus as set forth in claim 7, wherein the rotary cam means includes means operative after a predetermined number of cutter-extending step rotations of the rock shaft, to return the cutter to fully retracted position within the channel of the cutter bar.

9. An internal keyway or slot cutting machine, comprising in combination, a stationary support, and a head reciprocable bodily toward and from the support, means on the head for securing a bored workpiece, with the bore open toward the support, a longitudinally bored cutter bar having a base fixed upon the stationary support with the cutter bar aligned axially with the workpiece bore, said cutter bar having an upper end transversely channeled, and dimensioned to have a bearing fit within the workpiece bore whereby the workpiece is snugly slidable over the cutter bar as the head aforesaid is reciprocated, an elongate cutter no greater in length than the distance across the upper end of the cutter bar, said cutter having a sharpened tip normally disposed within the limits of the channel, and a body portion longitudinally slidable in the channel for selective projection of the tip outside the channel to a cutting position, a rock shaft rotationally supported within the longitudinal bore of the cutter bar, and cooperative means on the cutter and said rock shaft for translating axial rocking movements of the shaft to longitudinal movements of the cutter, means for bodily reciprocating the head carrying the workpiece, and cam means for step-rotating the rock shaft to partially and progressively extend the cutter upon each disposition of the head to one of its limits of travel, and to reversely rotate the rock shaft partially, between successive cutter-extending step-rotations, upon disposition of the head to its opposite limit of travel, the reverse rotations of the rock shaft being of lesser extent than the preceding cutter-extending step-rotation.

10. The apparatus as set forth in claim 9, wherein the cutter bar and the workpiece bore are disposed in an upright position, with an end of the workpiece bore opening downwardly, to release cutter chips by gravity upon each movement of the workpiece off the upper end of the cutter bar.

References Cited by the Examiner
UNITED STATES PATENTS

| | | | |
|---|---|---|---|
| 540,095 | 5/1895 | Giesler et al. | 90—49 X |
| 910,841 | 1/1909 | Murray | 90—49 |

WILLIAM W. DYER, Jr., *Primary Examiner.*